Figure 1:
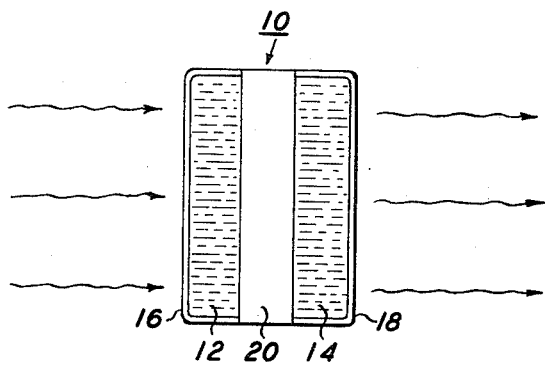

United States Patent [19]

Adams, Jr. et al.

[11] 3,711,181

[45] Jan. 16, 1973

[54] OPTICAL NOTCH FILTER

[75] Inventors: James E. Adams, Jr., Ontario; John L. Dailey, Pittsford, both of N.Y.

[73] Assignee: Xerox Corporation, Stamford, Conn.

[22] Filed: March 5, 1971

[21] Appl. No.: 121,378

[52] U.S. Cl. .................. 350/157, 350/147, 350/152
[51] Int. Cl. ............................................. G02f 1/24
[58] Field of Search...... 350/147, 150, 152, 154, 157, 350/160, 162

[56] References Cited

UNITED STATES PATENTS 3,114,836  12/1963  Fergason et al. ................ 350/154

OTHER PUBLICATIONS

Drichko, "Effect of Phase-Shifter Errors on Transmittance of an Interence-Polarization Filter Step" Opt. Tech. Vol. 37, No. 2 (Feb. 1970) pp. 90–93.

Fergason, "Cholesteric Structure-I. Optical Properties" Mol. Cryst. Vol. 1 (Apr. 1966) pp. 293–307.

Primary Examiner—David Schonberg
Assistant Examiner—Paul R. Miller
Attorney—James J. Ralabate, David C. Petre and Gaetano D. Maccarone

[57] ABSTRACT

An optical filter system capable of transmitting light at substantially all wavelengths of incident radiation while simultaneously rejecting radiation at a single wavelength band or plurality of wavelength bands within the incident radiation is described. The system employs optically negative liquid crystal films which are the same in intrinsic rotatory sense and means for converting circularly polarized light of one sense, e.g., right handed, to circularly polarized light of the opposite sense, e.g., left handed.

16 Claims, 2 Drawing Figures

PATENTED JAN 16 1973 3,711,181

INVENTORS
JOHN L. DAILEY
JAMES E. ADAMS
BY
J. D. Maccarone

ATTORNEY

OPTICAL NOTCH FILTER

BACKGROUND OF THE INVENTION

This invention relates to an optical filter system and more particularly, to an optical filter system which employs optically negative liquid crystalline substances.

Liquid crystalline substances exhibit physical characteristics, some of which are typically associated with liquids and others which are typically unique to solid crystals. The name "liquid crystals" has become generic to substances exhibiting these dual properties. Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a molecular structure which is unique to each of the three mesomorphic structures. Each of these structures is well known in the liquid crystal art.

Liquid crystals have been found to be sensitive or responsive to temperature, pressure, shear, foreign chemical compounds and to electric and magnetic fields, as disclosed in copending applications Ser. No. 646,532 filed June 16, 1967, Ser. No. 646,533 filed June 16, 1967 and now abandoned, Fergason et al. U.S. Pat. No. 3,114,838, French Pat. No. 1,484,584 and Fergason U.S. Pat. No. 3,409,404. Liquid crystals have also been found to be useful in imaging systems such as described in copending applications Ser. No. 821,565 filed May 5, 1969 now U.S. Pat. No. 3,652,148 and Ser. No. 867,593 filed Oct. 20, 1969 now U.S. Pat. No. 3,642,348.

Liquid crystalline substances having optically negative characteristics have been found to possess unique optical activity which makes such substances extremely useful in optical filter devices. An optical filter system which is capable of transmitting light at substantially all wavelengths of incident radiation while simultaneously rejecting radiation at a single wavelength band or plurality of wavelength bands within the incident radiation is described in copending application Ser. No. 104,369, filed Jan. 6, 1971 entitled "Optical Filter System." Generally speaking, the optical filter system disclosed in the above identified copending application employs one or more complementary matched pairs of optically negative liquid crystalline films to effect the desired result. Each complementary matched pair of these liquids crystalline films comprises two films which intrinsically reflect substantially the same wavelengths of incident light at normal incidence, or which are arranged to do so by varying the angle of incidence of the incident light thereon, with each film having an intrinsic rotatory sense which is opposite to that of the other film.

This optical filter system provides a very effective and efficient means for accomplishing the intended result. Of course, the system does have the inherent requirement that liquid crystal substances of opposite intrinsic rotatory sense must be used thus placing emphasis on the materials requirements of the system. It would be desirable to have such an optical filter system wherein the materials requirements can be simplified.

SUMMARY OF THE INVENTION

It is accordingly an object of this invention to provide an optical filter system having the above described desirable features.

It is a further object of the invention to provide an optical filter system which utilizes optically negative liquid crystal films.

It is another object of the invention to provide an optical filter system capable of transmitting substantially all wavelengths of incident radiation between and including the ultraviolet and the infrared regions of the electromagnetic spectrum while simultaneously rejecting one or more wavelength bands within said incident radiation.

It is still another object of the invention to provide an optical filter system which is suitable for use in the ultraviolet, visible and infrared regions of the electromagnetic spectrum.

Still further it is an object of the invention to provide an optical filter system which utilizes a technique of converting circularly polarized light of one sense, e.g., right handed, to circularly polarized light of the opposite sense, e.g., left handed.

It is yet another object of the invention to provide relatively inexpensive optical filters.

Another object of the invention is to provide optical filters in relatively large sizes.

A further object of the invention is to provide optical filters which can be used to detect the presence of or changes in the level of various stimuli such as temperature, chemical vapors, etc.

The foregoing and other objects and advantages are realized according to the invention, generally speaking, by making use of the unique properties of liquid crystalline substances which possess optically negative characteristics. Birefringence, also referred to as double refraction, is an optical phenomenon characteristic of some solid crystals and most liquid crystal substances. When a beam of unpolarized or plane polarized light strikes a birefringent substance it is split into two polarized components whose transverse vibrations are at right angles to each other. The two components are transmitted with different velocities through the substance and emerge as beams of polarized light. By the term "liquid crystalline substances which have optically negative characteristics", as used herein, is meant those for which the extraordinary index of refraction $n_E$ is smaller than the ordinary index of refraction $n_o$. Cholesteric liquid crystal substances exhibit this property. For a detailed description of this phenomenon see *Optical Crystallography*, Wahlstrom, 4th Edition, Wiley and Sons, Inc., New York.

The molecules in cholesteric liquid crystals are arranged in very thin layers with the long axis of the molecules parallel to each other and to the plane of the layers within each layer. Because of this configuration of the molecules, the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in "*Molecular Structure and the Properties of Liquid Crystals*," G. W. Gray, Academic Press, 1962.

Cholesteric liquid crystals have the property that when the propagation direction of plane polarized or unpolarized light is along the helical axis thereof, i.e., when the light enters in a direction perpendicular to the long axes of the molecules, this light is essentially unaffected in transmission through thin films of such liquid crystals except for a wavelength band centered about some wavelength $\lambda o$ where $\lambda o = 2\ np$ with $n$ representing the index of refraction of the liquid crystal substance and $p$ the pitch or repetition distance of the helical structure. The bandwidth $\Delta\lambda$ of this wavelength band centered about $\lambda o$ will typically be of the order of about $\lambda o/14$. For light of a wavelength $\lambda o$ the cholesteric liquid crystal, under these conditions exhibits selective reflection of the light such that approximately 50 percent of the light is reflected and approximately 50 percent is transmitted, assuming negligible absorption which is usually the case, with both the reflected and transmitted beams being approximately circularly polarized.

For light having wavelength around $\lambda o$ but not at $\lambda o$ the same effect is present but not completely. The transmitted light is not circularly polarized but is instead elliptically polarized. The cholesteric liquid crystals which exhibit this property of selective reflection of light in a region centered around some wavelength $\lambda o$ are said to be in the Grandjean or "disturbed" texture. If $\lambda o$ is in the visible spectrum, the liquid crystalline film appears to have the color corresponding to $\lambda o$ for normal viewing and normal incidence, and if $\lambda o$ is outside the visible spectrum, the film appears colorless.

Further depending upon the intrinsic rotatory sense of the helix, i.e., whether it is right handed or left handed, the light that is transmitted in the region about $\lambda o$ is either right hand circularly polarized light (RHCPL) or left hand circularly polarized light (LHCPL). The transmitted light is circularly polarized with the same sense of polarization as that intrinsic to the helix. Thus, a cholesteric liquid crystal having an intrinsic helical structure which is left handed in sense will transmit LHCPL and one having a helical structure which is right handed in sense will transmit RHCPL.

Hereinafter, these cholesteric liquid crystal substances will be identified in order to conform with popular convention, by the kind of light which if reflected at $\lambda o$. When a film is said to be right handed it is meant that it reflects RHCPL and when a film is said to be left handed, it is meant that it reflects LHCPL.

A right handed cholesteric liquid crystal substance transmits LHCPL essentially completely at $\lambda o$ whereas the same substance reflects almost completely RHCPL. Conversely, a left handed film is almost transparent to RHCPL at $\lambda o$ and reflects LHCPL. Since plane polarized or unpolarized light contains equal amounts of RHCPL and LHCPL, a cholesteric liquid crystal film is approximately 50 percent transmitting at $\lambda o$ for these sources when the liquid crystal is in its Grandjean texture.

A further unique optical property of optically negative liquid crystal films is that contrary to the normal situation when light is reflected, such as by a mirror, where the sense of the circular polarization of the reflected light is reversed, the same phenomenon does not occur with light reflected by these liquid crystal films. The sense of the circular polarization of light reflected from these liquid crystal substances is not reversed but rather, remains the same as it was before it came into contact with the liquid crystal substance. For example, if RHCPL having a wavelength $\lambda o$ is directed at a right hand film having $\lambda o = 2\ np$, it is substantially completely reflected and, after reflection, remains RHCPL. If the same light were to be directed on a mirror, the reflected light would be LHCPL. The invention utilizes these unique properties of optically negative liquid crystal substances to provide a novel optical filter system.

According to the invention there is provided an optical filter system employing at least one pair of optically negative liquid crystalline films in conjunction with means for converting circularly polarized light of one sense to circularly polarized light of the opposite sense. Each pair of liquid crystal films comprises two individual films which have the same intrinsic rotatory sense and which are arranged in the path of an incident light beam in a manner such that they reflect substantially the same wavelength band within the incident radiation as will be explained in detail further below. By positioning each film of any film pair employed in a particular apparatus on either side of the means for converting the circularly polarized light from that of one sense to that of the opposite sense a highly effective and efficient optical filter is constructed.

Figure 2:
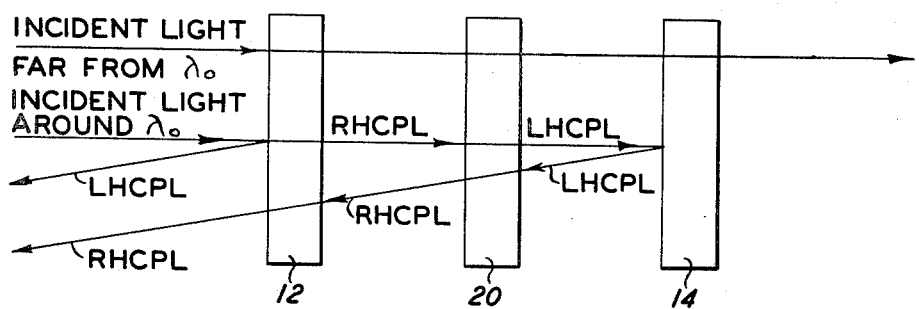

The invention will be more fully understood and appreciated from the following detailed description of various preferred embodiments thereof particularly when read in conjunction with the accompanying drawings wherein:

FIG. 1 is a schematic side cross sectional view of a typical optical filter constructed according to the invention; and FIG. 2 is a diagrammatic illustration describing the effect which occurs when incident light is directed upon the typical optical filter shown in FIG. 1.

Referring now to FIG. 1, there is shown a typical optical filter, generally designated 10, of the invention comprising in this illustrative instance, optically negative liquid crystalline films 12 and 14, with optional protective elements 16 and 18 respectively, positioned on either side of element 20 for converting circularly polarized light of one sense to that of the opposite sense. Liquid crystalline films 12 and 14 are comprised of substances selected so as to have the same intrinsic rotatory sense, i.e., both are either right handed or left handed, and to reflect substantially the same wavelength band within the incident radiation. Each film, according to this embodiment of the invention may be comprised of different liquid crystalline substances which have the same $\lambda o$ value; or according to a preferred embodiment of the invention, the identical liquid crystalline substance may be used for both films. For optimum results, optical filter 10 is preferably placed in the path of incident radiation represented by the arrows, so that the filter is normal to the incident radiation although it will be appreciated by those skilled in the art that the angle of incidence of the incident radiation upon the filter may be other than normal. When the incident radiation is not normal to the filter and the helical axes of the liquid crystal substances are not exactly aligned along the direction of the light propogation, the filter system will continue to function in the manner described but with some deterioration of the bandwidth of the reflected wavelength band. Good results are obtained where the angle of incidence is in the range of from about 80° to about 100°. Substantially all of the incident radiation will be transmitted by the filter with the exception of some wavelength band centered around some wavelength $\lambda o$ which corresponds to the $\lambda o$ value of liquid crystalline films 12 and 14.

FIG. 2 shows in detail the proposed theoretical operating mechanism for the system of the invention. The spatial and angular separations are for purposes of illustration only. The incident beam is panchromatic and normal to the surface of the filter. The optical filter system of the invention has been shown to be operative by means of experimentation and thus there is no intention to limit the invention to this theory of operation; it is given to clarify the invention. In FIG. 2 like numerals have been used to identify elements of the optical filter which are identical with those in FIG. 1. It will be assumed for purposes of illustration that liquid crystal films 12 and 14 are left-handed in intrinsic rotatory sense although, of course, it will be understood that they could both be right-handed. Referring now to FIG. 2 it is seen that within the incident light which strikes the optical filter, the wavelengths of incident light which are far from $\lambda o$ pass through the filter substantially completely unattenuated. Consider however what occurs with respect to those wavelengths of incident light which are around, and including, $\lambda o$. Within this wavelength region the LHCPL component of the incident light is substantially completed reflected by left-handed liquid crystal film 12 and the RHCPL component of the incident light is substantially completely transmitted by film 12. When the RHCPL component contacts element 20 it passes through substantially completely unattenuated but now emerges from element 20 as LHCPL. Subsequently, the now LHCPL strikes left-handed liquid crystalline film 14 and is substantially completely reflected with the reflected light remaining LHCPL. The light beam then is directed back on to element 20 which again reverses the sense of the polarization of the light while transmitting it therethrough substantially completely unattenuated, the light now becoming RHCPL again. The RHCPL is then substantially completely transmitted by liquid crystal film 12 thus resulting in the substantially complete reflection by the filter of the wavelength band centered around $\lambda o$.

Hereinafter any pair of optically negative liquid crystalline films having the same intrinsic rotatory sense and which, when each individual film of the pair is positioned on either side of a means for converting circularly polarized light of one sense to circularly polarized light of the opposite sense, will cooperate to reflect substantially completely a wavelength band within the incident radiation while substantially completely transmitting the remainder of the incident radiation will be referred to as a cooperative matched pair of optically negative liquid crystal films.

Any suitable cholesteric liquid crystalline material, mixture or composition comprising cholesteric liquid crystals or composition having cholesteric liquid crystalline characteristics may be utilized for liquid crystal films 12 and 14. Typical suitable cholesteric liquid crystal substances include derivatives from reactions of cholesterol and inorganic acids, such as, for example: cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl docosonoate; cholesteryl chlorofomate; cholesteryl propionate; cholesteryl acetate; cholesteryl valerate; cholesteryl vacconate; cholesteryl linolenate cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl-2-(2-methoxyethoxy) ethyl carbonate; cholesteryl geranyl carbonate; cholesteryl heptyl carbamate; and alkyl amides and aliphatic secondary amines derived from 3$\beta$-amino $\Delta$5-cholestene and mixtures thereof; peptides such as poly-$\gamma$-benzyl-$l$-glutamate; derivatives of beta sitosterol such as sitosteryl choloride; and amyl ester of cyano benzylidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline materials in the advantageous system of the present invention.

Compositions containing cholesteric liquid crystals and nematic liquid crystalline substances may also be utilized as the liquid crystal films of the optical filter system; and it has been found that such compositions may contain up to 98 percent by weight of the nematic component yet continue to function in accordance with the invention. Nematic liquid crystalline materials suitable for use in combination with cholesteric liquid crystalline materials in the advantageous system of the present invention include: p-azoxyanisole, p-ozoxyanisole, p-azoxyphenetole, p-butoxybenzoic acid, p-methoxy-cinnaminic acid, butyl-p-anisylidene-p'-aminocinnamate, anisylidene para-amino-phenylacetate, p-ethoxy-benzylamino-a-methyl-cannamic acid, 1,4-bis (p-ethoxy benzylidene) cyclo hexanone, 4,4'-dihexyloxybenzene, 4,4'-diheptyloxybenzene, anisal-p-amino-azobenzene, anisaldazine, a-benzeneazo-(anisal-$\alpha$'-naphthylamine), anisylidene-p-n-butylaniline, n,n'-nonoxybenzyl-toluidine, mixtures of the above and many others.

Compositions suitable for use as liquid crystal films of the novel optical filter system may also comprise mixtures of cholesteric liquid crystals and suitable smectic liquid crystalline substances as well as mixtures of cholesteric liquid crystals and suitable non-liquid crystalline substances which are compatible with the cholesteric liquid crystal component. Typical suitable non-liquid crystalline materials include cholesterol, lecithin and the like. Typical suitable smectic liquid crystal substances include: n-propyl-4'-ethoxy biphenyl-4-carboxylate; 5-chloro-6-n-heptyloxy-2-naphthoic acid; lower temperature mesophases of cholesteryl octanoate, cholesteryl nonanoate, and other open-chain aliphatic esters of cholesterol with chain length of 7 or greater; cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl-4-carboxylic acids ethyl-p-azoxy-cinnamate; 3-ethyl-p-4-ethoxybenzylidene-aminocinnamate; ethyl-p-azoxybenzoate; potassium oleate; ammonium oleate; p-n-octyloxybenzoic acid; the low temperature mesophase of 2-p-n-alkoxybenzlideneaminofluorenones with chain length of 7 or greater; the low temperature mesophase of p-(n-heptyl) oxybenzoic acid; anhydrous sodium stearate; thallium (I) stearate; mixtures thereof and others.

Mixtures of liquid crystals can be prepared in organic solvents such as chloroform, petroleum, ether and others, which are typically evaporated from the mixture thus leaving the liquid crystal composition. Alternatively, the individual components of the liquid crystalline mixture can be combined directly by heating the mixed components above the isotropic transition temperatures.

The above lists of suitable liquid crystalline imaging materials are intended to encompass mixtures of any of the above. The list is representative of suitable materials, and is in no way intended to be exhaustive or limiting. Although any liquid crystalline composition having cholesteric liquid crystalline characteristics is suitable for use in the present invention, it should be recognized that various different cholesteric liquid crystal substances or mixtures thereof or combinations of cholesteric liquid crystal substances with other substances such as nematic liquid crystals will typically possess the desired properties which make them suitable for use according to the invention in some specific temperature range which may be at room temperature or substantially above or below room temperature. However, all of the various substances, mixtures or combinations thereof will function according to the method of the invention at some temperature. Typically, the optical filters of the invention will be used at or near room temperature. Generally speaking, the liquid crystal substance will preferably have a liquid crystal state at the desired operational temperature. Of course, liquid crystal films having $\lambda o$ values in the ultraviolet or infrared regions of the electromagnetic spectrum may be employed. Liquid crystal substances are known or compositions thereof may be prepared having $\lambda o$ values of from about 2700A to about 10 microns.

For optimum results the liquid crystal films employed in the optical filters of the invention will preferably have a thickness of from about 0.5 to about 20 microns. The effects obtained in accordance with the invention do not depend on film thickness except to the extent that film thickness should preferably be greater than $\lambda o$ in order to produce full intensity in the reflected light. When the films are relatively thin, i.e., when they have a thickness less than wavelength $\lambda o$, they will typically not selectively reflect light around $\lambda o$ as efficiently as previously described. When the films are of relatively great thickness the molecules of the liquid crystalline substance will usually not align properly and the observed behavior will not be consistent with the optimum results attainable with this optical filter system. For liquid crystal films which have a $\lambda o$ value in the visible region, film thickness of from about 3 to about 10 microns will give optimum results.

Liquid crystal films 12 and 14 are typically tacky, soft, viscous or liquid and thus are preferably covered with protective elements 16 and 18 respectively to protect the films from foreign matter such as dust, insects or the like. The purpose of the protective elements is to keep the liquid crystal films contained and free of any contamination. Thus, the protective elements in the embodiment described in FIG. 1 may be of any suitable material, flexible or rigid, which is optically transparent to the incident light radiation and which is non-reactive with the liquid crystalline films. Typical suitable materials for this purpose include glass, clear plastics such as, for example, Tedlar, Mylar, polyethylene, polypropylene or the like and any other materials having the required characteristics. It is further preferred to employ materials which have an index of refraction about the same as that of the liquid crystal films to minimize loss of light. The protective outer elements would typically be of a thickness of from about 0.25 to about 10 mils.

It should be recognized that in other embodiments of the invention the liquid crystalline films could be completely encased by protective material such as, for example, where the individual elements of the optical filter are mounted independently of each other. In instances such as that described, where any protective material is located between the liquid crystal film and the means for converting circularly polarized light of one sense to that of the opposite sense the protective material must be optically isotropic as well as optically transparent and non-reactive with the liquid crystalline substances. Typical suitable materials which can be used in these situations include glass, fused silica and any other materials having the required characteristics.

Element 20 which is utilized to convert circularly polarized light of one sense to that of the opposite sense may be any suitable material capable of performing this function. Typical suitable materials include a half wave plate for a particular $\lambda o$, such as are available from Polaroid Corp., Bausch & Lomb and others; electro-optical devices such as are available from Baird Atomic, Cambridge, Massachusetts; and the like.

Of course, the embodiment described in FIG. 1 is meant to be representative only since, as will be recognized by those skilled in the art, an optical apparatus containing any number of optical filters, such as are shown in FIG. 1, arranged in series can be constructed. An optical apparatus having a plurality of individual optical filters will reflect a plurality of wavelength bands within the incident radiation. Further, although each individual film of any cooperative matched pair of optically negative liquid crystal films can have the same intrinsic $\lambda o$ value, i.e., the center wavelength of the wavelength band reflected at normal incidence, and both can be comprised of the same liquid crystalline substance, this is not a necessity according to the invention. As will be understood by those skilled in the art the $\lambda o$ value of any optically negative liquid crystal film may be changed by rotating the film with respect to the angular incidence of the incident radiation. Thus, since the shift effected in the $\lambda o$ value of a film in this manner is always from the longer wavelength to a shorter wavelength, where the individual films of any cooperative matched pair of films do not have the same intrinsic $\lambda o$ value, the $\lambda o$ value of each may be brought into coincidence by rotating the film having the larger $\lambda o$ value while holding the other in a fixed position. When the wavelength band reflected by each film is substantially the same the films then come within the definition of a cooperative matched pair of liquid crystal films as it is used herein. In the optical filters described the individual elements thereof are preferably mounted so as to be rotatable independently of each other. Of course, once the $\lambda o$ values of the individual films have been brought into coincidence the filter itself may be rotated with respect to the incident light beam thereby resulting in a shift in the wavelength band reflected by the filter. It will be apparent that a variety of different effects may be achieved by means of rotating the individual films on the filters. For example, where an optical apparatus has a plurality of optical filters, one of the optical filters can be rotated while the others are held fixed so as to shift only one of the wavelength bands reflected by the apparatus or the apparatus itself may be rotated thus shifting all of the reflected wavelength bands. A detailed description of the technique of rotating the liquid crystalline films in this manner is given in copending application Ser. No. 104,368, filed Jan. 6, 1971. entitled "Tuning Method For Optical Devices" and now incorporated by reference herein.

It can be readily seen that the novel optical filter system of the invention offers a great number of advantages. For example, where the same optically negative liquid crystalline substance is used for both films of a cooperative matched pair the filter is not only automatically tuned, i.e., both films reflect substantially the same wavelength band, but the tuning of the filter is automatically stable to any change in the pitch of the liquid crystalline substance in response to environmental perturbations such as temperature, chemical vapors, etc. since the change will be identical in both films. Moreover an optical filter may be constructed so as to be relatively insensitive to the presence of a particular stimulus by selecting a liquid crystalline substance whose pitch is relatively stable to changes in the particular stimulus over a given range of environmental conditions in which the filter is used. On the other hand, there are certain applications where it is desirable to use different liquid crystal substances having different pitch vs stimulus coefficients for the films of a cooperative matched pair. For example where the filter device is to be used as a detector to indicate changes in the stimulus present, e.g., temperature or chemical vapors, the filter can be tuned for a particular desired ambient level and when this stimulus level shifts the two films will respond differently thus becoming mismatched and drifting off null. This may be conveniently done since the pitch of certain optically negative liquid crystalline substances is extremely sensitive to particular stimuli whereas the pitch of others is less sensitive to the same stimuli as is known to those skilled in the art.

The invention will now be further described with reference to specific preferred embodiments by way of examples to further aid those skilled in the art to practice the same, it being understood that these are intended to be illustrative only and the invention is not limited to the conditions, procedures, devices or materials recited therein. All parts and percentages recited are by weight unless otherwise specified.

The behavior of the optical filters described in the examples is observed by measuring the transmission spectra of the filters using a Cary Spectrometer. The reflection spectrum of each of the filters is inferred from its transmission spectrum since there is only negligible absorption in each case.

EXAMPLE I

A first right-handed optically negative liquid crystalline composition containing about 50 percent cholesteryl iodide and about 50 percent cholesteryl chloride and having a $\lambda o$ value of about 5900A is prepared. A second right-handed optically negative liquid crystalline composition containing about 10 percent cholesteryl chloride and about 90 percent cholesteryl bromide and having a $\lambda o$ value of about 5900A is also prepared. A thin film of the first liquid crystal composition is applied to one surface of a half wave plate available from Polaroid Corporation and a glass plate is placed over the free surface of the liquid crystal film. A thin film of the second liquid crystal composition is then applied to the other surface of the half wave plate and a glass plate is placed against the free surface of the second liquid crystal film. This optical filter is placed in the path of a light beam emitted from a broad band incandescent source of visible radiation so that the radiation strikes the filter at normal incidence. The optical filter substantially completely transmits all of the incident radiation with the exception of a wavelength band centered about a wavelength of about 5900A which is reflected.

The procedure described in Example I is repeated with the exception that the liquid crystalline composition listed for each example is used for both liquid crystal films of the optical filter.

EXAMPLE II

A liquid crystalline composition containing about 25 percent cholesteryl chloride and about 75 percent cholesteryl nonanoate and having a $\lambda o$ value of about 5200A.

EXAMPLE III

A liquid crystalline composition containing about 80 percent cholesteryl chloride and about 20 percent cholesteryl oleyl carbonate and having a $\lambda o$ value of about 6800A.

EXAMPLE IV

A liquid crystalline composition containing about 20 percent cholesteryl chloride and about 80 percent cholesteryl bromide and having a λo value of about 5900A.

EXAMPLE V

A liquid crystalline composition containing about 20 percent anisylidene-p-n-butylaniline and about 80 percent cholesteryl oleyl carbonate and having a λo value of about 4000A.

EXAMPLE VI

A liquid crystalline composition containing about 57 percent cholesteryl formate and about 43 percent cholesteryl nonanoate and having a λo value of about 5000A.

EXAMPLE VII

A liquid crystalline composition containing about 20 percent cholesterol and about 80 percent cholesteryl oleyl carbonate and having a λo value of about 5500A.

EXAMPLE VIII

A liquid crystalline composition containing about 10 percent of cholesterol and about 90 percent of a mixture of equal parts of cholesteryl-2-(2-ethoxy ethoxy) ethyl carbonate and cholesteryl oleyl carbonate and having a λo value of about 7000A.

EXAMPLE IX

A liquid crystalline composition containing about 20 percent cholesteryl-2-(2-butoxyethoxy) ethyl carbonate and about 80 percent cholesteryl chloride and having a λo value of about 6000A.

EXAMPLE X

A liquid crystalline composition containing about 84 percent cholesteryl chloride and about 16 percent of a mixture of equal parts of cholesteryl propionate and cholesteryl decanoate and having a λo value of about 7400A.

EXAMPLE XI

A liquid crystalline composition containing about 74 percent cholesteryl chloride and about 26 percent cholesteryl acetate and having a λo value of about 7700A.

EXAMPLE XII

A liquid crystalline composition containing about 80 percent cholesteryl chloride and about 20 percent cholesteryl butyrate and having a λo value of about 7300A.

EXAMPLE XIII

A liquid crystalline composition containing about 90 percent cholesteryl chloride and about 10 percent cholesteryl laurate and having a λo value of about 6600A.

EXAMPLE XIV-XVII

The procedure described in Example I is repeated with the exception that the liquid crystalline composition listed for each example is used for both liquid crystal films of the optical filter and a source of infrared radiation is used for the light source.

EXAMPLE XIV

A liquid crystalline composition containing about 68 percent cholesteryl-2-(2-ethoxyethoxy) ethyl carbonate and about 32 percent cholesteryl-n-propyl carbonate and having a λo value of about 2.0 microns.

EXAMPLE XV

A liquid crystalline composition containing about 10 percent cholesterol and about 90 percent cholesteryl chloride and having a λo value of about 4.8 microns.

EXAMPLE XVI

A liquid crystalline composition containing about 68 percent cholesteryl chloride and about 32 percent cholesteryl valerate and having a λo value of about 1.74 microns.

EXAMPLE XVII

A liquid crystalline composition containing about 79 percent cholesteryl chloride and about 21 percent cholesteryl stearate and having a λo value of about 1.5 microns.

The invention has been described in detail with respect to various embodiments and further by way of specific examples. It should be recognized however that the invention is not limited to the embodiments described but rather that modifications and variations are possible which are within the spirit of the invention and the scope of the claims.

What is claimed is:

1. An optical apparatus comprising at least one optical filter, each said optical filter comprising means for converting circularly polarized light of one sense to circularly polarized light of the opposite sense arranged between a cooperative matched pair of optically negative liquid crystal films.

2. The optical apparatus defined in claim 1 wherein λo for each said optical filter is in the visible region of the light spectrum.

3. The optical apparatus as defined in claim 1 wherein each individual liquid crystal film of each said optical filter is from about 0.5 to about 20 microns in thickness.

4. The optical apparatus as defined in claim 2 wherein each individual liquid crystal film of each said optical filter is from about 3 to about 10 microns in thickness.

5. The optical apparatus as defined in claim 1 wherein each individual liquid crystal film of each said optical filter comprises a composition selected from the group consisting of: cholesteric liquid crystalline substances; mixtures of cholesteric liquid crystalline substances and nematic liquid crystalline substances; mixtures of cholesteric liquid crystalline substances and smectic liquid crystalline substances; mixtures of cholesteric liquid crystalline substances and non-liquid crystalline substances which are compatible with cholesteric liquid crystalline substances; and mixtures thereof.

6. The optical apparatus as defined in claim 1 wherein the individual liquid crystal films of at least one of said optical filters comprise the same liquid crystalline substance.

7. The optical apparatus as defined in claim 1 wherein the individual liquid crystal films of at least one of said optical filters comprise different liquid crystalline substances.

8. A method for removing at least one wavelength band from incident light radiation while retaining substantially all other wavelengths of light within the incident radiation comprising:
   a. providing a light source;
   b. providing an optical apparatus comprising at least one optical filter each said optical filter comprising means for converting circularly polarized light of one sense to circularly polarized light of the opposite sense arranged between a cooperative matched pair of optically negative liquid crystal films; and
   c. directing light from said light source upon said optical apparatus whereby the emergent light beam contains substantially all the wavelengths of light of the incident radiation with the exception of a wavelength band corresponding to each said optical filter.

9. The method as defined in claim 8 wherein said incident light is directed upon said optical apparatus at normal incidence.

10. The method as defined in claim 8 wherein said incident light is directed upon said optical apparatus at an angular incidence of from about 80° to about 100°.

11. The method as defined in claim 8 wherein $\lambda_o$ for each said optical filter is in the visible region of the light spectrum.

12. The method as defined in claim 8 wherein each individual liquid crystal film of each said optical filter is from about 0.5 to about 20 microns in thickness.

13. The method as defined in claim 11 wherein each individual liquid crystal film of each said optical filter is from about 3 to about 10 microns in thickness.

14. The method as defined in claim 8 wherein each individual liquid crystal film of each said optical filter comprises a composition selected from the group consisting of: cholesteric liquid crystalline substances; mixtures of cholesteric liquid crystalline substances and nematic liquid crystalline substances; mixtures of cholesteric liquid crystalline substances and smectic liquid crystalline substances; mixtures of cholesteric liquid crystalline substances and non-liquid crystalline substances which are compatible with cholesteric liquid crystalline substances; and mixtures thereof.

15. The method as defined in claim 8 wherein the individual liquid crystal films of at least one of said optical filters comprise the same liquid crystalline substance.

16. The method as defined in claim 8 wherein the individual liquid crystal films of at least one of said optical filters comprise different liquid crystalline substances.

* * * * *